United States Patent [19]

Fischer

[11] Patent Number: 4,676,124

[45] Date of Patent: Jun. 30, 1987

[54] DRAG BIT WITH IMPROVED CUTTER MOUNT

[75] Inventor: John G. Fischer, Coppell, Tex.

[73] Assignee: Dresser Industries, Inc., Dallas, Tex.

[21] Appl. No.: 883,224

[22] Filed: Jul. 8, 1986

[51] Int. Cl.$^4$ .......................... B21K 5/02; E21B 10/56
[52] U.S. Cl. ................... 76/108 A; 175/410; 175/411; 228/132; 228/248
[58] Field of Search ............. 76/108 A, 108 R, 101 E; 175/329, 410, 411, 374, 375; 228/119, 132, 134, 248; 407/118

[56] References Cited

U.S. PATENT DOCUMENTS

| | | | |
|---|---|---|---|
| 4,265,324 | 5/1981 | Morris et al. | 175/329 |
| 4,396,077 | 8/1983 | Radtke | 76/108 A |
| 4,605,157 | 8/1986 | Barr | 76/108 A |

Primary Examiner—Roscoe V. Parker
Attorney, Agent, or Firm—Fred A. Winans

[57] ABSTRACT

An earth boring drag bit is shown having polycrystalline diamond cutters mounted in cavities within the body thereof in a manner that, at the juncture of the dissimilar geometry of the cutters and the body, defines voids adjacent the cutters. These voids are filled with a powder tungsten carbide material to a level sufficient to eliminate the voids and is retained therein by a braze material infiltrated into the powder metal, thereby defining a wear-resistant continuous surface immediately adjacent the cutter element.

8 Claims, 4 Drawing Figures

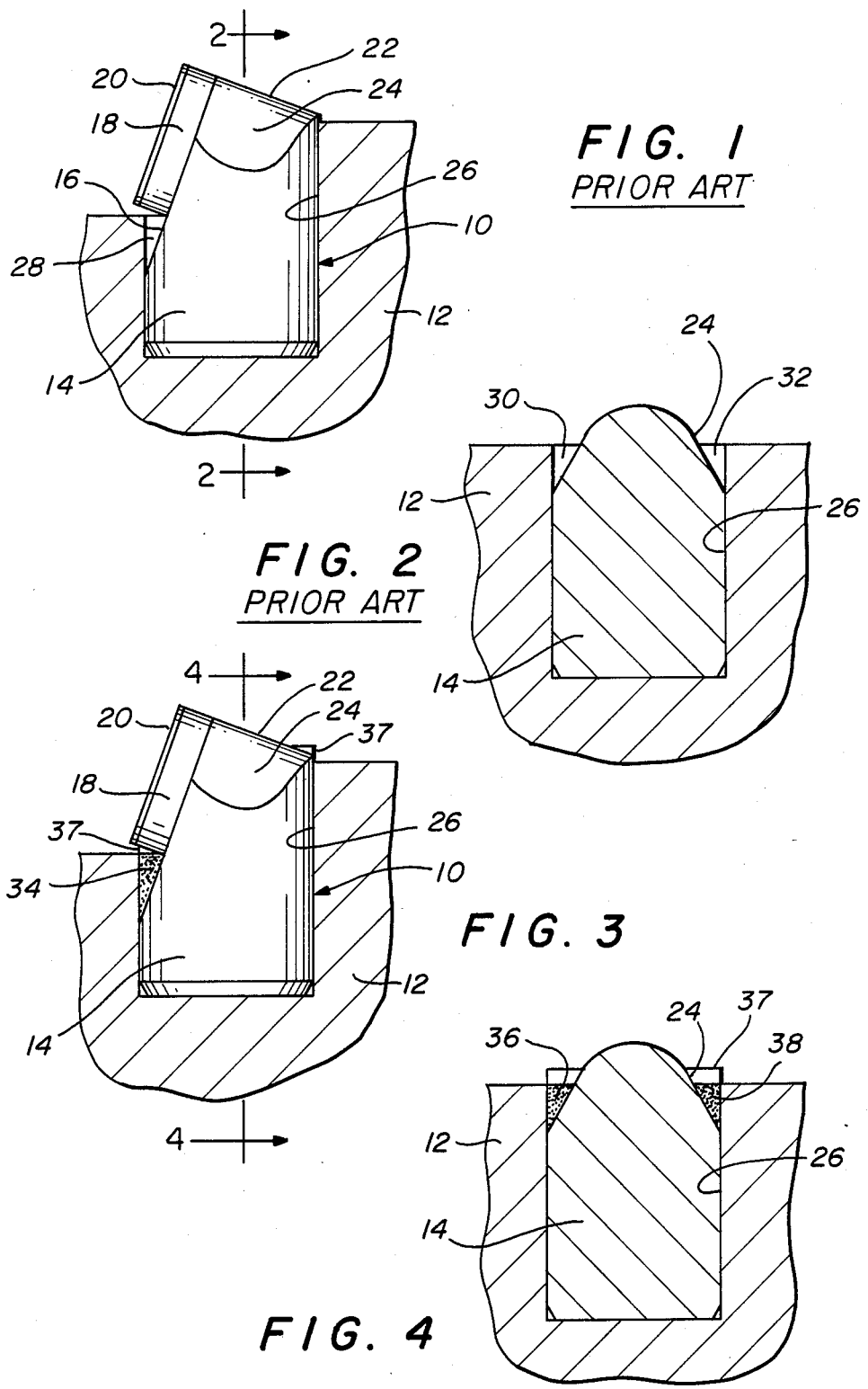

DRAG BIT WITH IMPROVED CUTTER MOUNT

BACKGROUND OF THE INVENTION

1. Field of the Invention

This invention relates to a drag bit having stud-mounted polycrystalline diamond (PDC) cutting elements and more particularly, to an improved structure for securing the studs elements within the body of the bit.

2. Description of the Prior Art

Stud-mounted polycrystalline diamond cutting elements are readily commercially available, one such being a STRATAPAX cutting element from General Electric. Such PDC cutting elements generally comprise a cylindrical stud of tungsten carbide having an angular planar face formed at one end of the stud. A generally cylindrical wafer of tungsten carbide is brazed onto the planar face with the opposite exposed face of the wafer comprising a layer of polycrystalline diamonds.

In fabricating a drag bit utilizing such PDC cutters, the body of the bit has cavities open to the surface with such cavities generally corresponding to the diameter of the cylindrical stud. The PDC cutter is then oriented within the cavities such that the polycrystalline diamond surface faces in the direction of rotation of the bit. Although in some bit bodies the studs are press-fit within the cavities, it is also well known to retain the studs by brazing, with a well known brazing material, such as by wrapping the studs with a foil of the brazing material prior to insertion in the cavities and properly orienting them prior to subjecting the bit body and assembled cutting elements to a brazing temperature.

The angular planar surface formed in the stud on which the wafer is mounted, and the exposed exterior end of the tungsten carbide stud, which is rounded to generally conform to the cylindrical surface of the wafer mounted on the planar surface, provide surfaces which, when the stud is seated within the cavity, terminate below the surface of the bit body such that the dissimilar geometries of the bit body and such surfaces define various voids below the surface of the bit and adjacent the internal wall of the cavity. During boring or drilling conditions, wherein highly abrasive drilling fluid is circulated across the bit face and adjacent the cutters to remove the cuttings and cool the cutter, the high velocity fluid enters these voids with such velocity that it causes erosion of the bit body and also permits erosive attack of the brazed joint between the bit body and cutting element in those bit bodies in which the stud is secured by brazing. Such action ultimately washes out the support around the cutter to the extent that quite often the cutter is released from the bit body with substantial deleterious effect on the ability of the bit to continue drilling.

SUMMARY OF THE PRESENT INVENTION

According to the present invention, all voids within the cutter cavity between the cutter and the adjacent surface of the bit body are filled with a tungsten carbide powder which, during a brazing process, is infiltrated with a braze material such that these voids are ultimately filled with a wear-resistant powdered tungsten carbide and braze material which is much harder than the relatively soft braze material alone, thereby eliminating the voids at the dissimilar geometries and protecting any brazed joint between the stud and the bit body.

DESCRIPTION OF THE DRAWINGS

FIG. 1 is an elevational cross-sectional view of a polycrystalline diamond cutter mounted in a bit body and, as typical of the prior art, showing voids between the body and the cutter;

FIG. 2 is a view along line 2—2 of FIG. 1 showing other voids between the bit body and the cutter typical in the prior art mounting arrangements; and FIGS. 3 and 4 are views similar to FIGS. 1 and 2 respectively, showing the prior art voids filled with tungsten carbide powder and prepared to be infiltrated with braze material in accordance with the present invention.

DESCRIPTION OF THE PREFERRED EMBODIMENT

Referring to FIGS. 1 and 2, a PDC cutting element 10 is munted in the body 12 of a drag bit as is typical of prior art mounting arrangements. The cutting element 10, also as is well known, comprises a cylindrical stud 14 formed of a tungsten carbide material having, adjacent one end thereof, an angled planar face 16 formed thereon. A generally cylindrical tungsten carbide wafer 18, also having opposed planar faces, is bonded as by brazing, to the angled face 16 of the stud 14 along one of its faces and a layer of polycrystalline diamond material 20, forming the cutting face of the cutting element, is bonded to the opposite face. The exterior terminal end 22 of the cutter stud 14 adjacent the wafer 18 is contoured, such as at 24 to conform generally to the outer circular circumference of the wafer 18.

The stud 14 is disposed within the body of the bit 12 by being inserted in an appropriately sized cavity 26 within the body, and oriented such that the cutting surface 20 faces generally in the direction of rotation of the bit. In mounting the stud within such cavity, it is preferred to maintain a very close fit between the stud 14 and the cavity 26 to minimize the braze within the braze joint therebetween which in turn provides a brazed joint of maximum strength. One well known brazing technique is to wrap each individual stud 14 with a braze foil prior to inserting the stud in the cavity 26, or pre-tinning the stud with a braze alloy, and subjecting the assembly, in a brazing furnace, to an elevated temperature sufficient to melt the braze foil or alloy and have it flow throughout the joint, but below any temperature that would effect the braze joint of the wafer 18 on the stud 14 or damage the polycrystalline diamond materials.

Further as is seen with reference to FIGS. 1 and 2, it is typical to mount the stud 14 in the cavity 26 such that the bit body 12 adjacent the terminal end 22 of the stud extends generally adjacent the portion of the angled surface 16 of the stud on which the wafer is muonted, and the bit body adjacent the curved portion 24 of the stud is raised to provide additional back support. It will be noted in FIGS. 1 and 2 that under such conditions, there are junctures of dissimilar geometries between the bit surface and the stud that provide or define voids between the stud 14 and the internal wall of the cavity 26 in the bit body. Such voids are defined, as for instance, between the angled surface 16 and the walls of the cavity 26, as indicated at numeral 28 and particularly, with reference to FIG. 2, between the contoured upper face 24 of the stud and the bit body as indicted at numerals 30, 32.

Although the above FIGS. 1 and 2 are illustrative of typical voids between dissimilar geometries when mounting a cutter stud within a cavity of a bit body, as is well known in the prior art, other specific structures of prior art assemblies are well known which provide other, but similar, voids between the stud, or cutter body, and the wall of the cavity generally below the surface of the bit body.

Exemplary of such structure is U.S. Pat. No. 4,265,324 which shows additional voids provided when a polycrystalline diamond cutting element is disposed in a cavity of a drag bit body having a surface at the same height at the front and rear of the element, and enlarging the cavity to accommodate countersinking the lower edge of the diamond cutting surface below the bit surface.

In all such drag bits it is necessary, during drilling operation, to maintain the cutting surface of the cutters relatively free from cuttings and also relatively cool. This is accomplished by flushing the bit surface with high velocity fluids such as drilling mud which is also well known to be highly abrasive. Under such conditions, the high velocity drilling fluid attacks these voids between the cavity 26 and the stud 14, and further attacks the relatively soft braze material at the brazed joint, with the end result being that the material of the bit body defining such voids is eroded and the voids are thereby enlarged to the extent that ultimately the studs 14 are no longer securely retained within the cavities and are lost during drilling. Such cavity enlarging and wash-out is particularly critical in structure such as illustrated as cavity 28 in FIG. 1 wherein a relatively narrow portion of the bit body defines the cavity and is relatively quickly eroded away to expose the shank of the cutting element stud 14.

In accordance with the resent invention and with particular reference to FIGS. 3 and 4, the studs 14 are, as before, mounted within the cavities 26 of the bit body 12 in such a manner that, at the juncture of the dissimilar geometries, certain voids are defined between the bit body and the stud 14. Prior to brazing the stud 14 within the body, the voids are filled with a powdered tungsten carbide material, such as shown at 34, 36, 38 in these figures. The brazing of the stud 14 to the body 12 is then accomplished in a manner similar to the prior art, whereby the bit body with the studs mounted therein is placed in a brazing furnace, after a braze foil has been inserted therebetween. However, in accordance with the preferred embodiment, the brazing foil 37 encircling the stud prior to being inserted in the cavity is disposed to extend somewhat above the surface of the bit body and the juncture of the dissimilar geometries upon assembly of the stud within the body. The foil thus defines a volume or envelope for receiving a powdered tungsten carbide filling material in an amount sufficient to fill the voids to the bit surface between the dissimilar geometries such at 34, 36, 38. Alternatively, a ring or collar member of braze material could be disposed on the bit surface to encircle the stud adjacent the cavity and in like manner, form an envelope for retaining the powdered tungsten carbide filling material within the voids. With either such arrangement or any equivalent (i.e. merely filling the voids with the tungsten carbide powder and placing a portion of solid braze material immediately adjacent thereto), the bit is then placed in the brazing furnace and the metal foil or portion of braze material, upon melting, in addition to brazing the stud within the cavity, infiltrates the powdered metal tungsten carbide filler material to form a substantially continuous surface between the bit body and the stud 14 that is more wear-resistant than the braze metal alone. It is to be understood that subsequent to the material melting and infiltrating the powdered tungsten carbide, the finished product will appear such as shown in FIGS. 3 and 4; however, absent the upstanding foil envelope 37, which will be dispersed throughout the powder to form a continuous, substantially solid surface up to and engaging the stud 14.

Thus, it can be seen that, in accordance with the present invention, the stud 14 is retained within the bit body 12 in a manner that reduces or eliminates the tendency of the high velocity drilling mud to attack the brazed joint between the stud 14 and the bit body by (1) eliminating, by filling, the voids to define a continuous surface; and (2) defining a wear-resistant material generally throughout the exposed area of the braze joint. Although this procedure can be done on either matrix body or steel body bits, it is only necessary that the braze material for unifying the tungsten carbide powder have a lower melting temperature than the melting temperature of any braze between the diamond cutting wafer and the stud, or would cause damage to the matrix or steel body or the polycrystalline diamond material (i.e. below approximately 1450° F.). Also, the filler tungsten carbide powder must have a higher melting temperature than the braze material. Generally such braze material is a silver copper brazing alloy commercially available and well known in the art and having a melting temperature in the range of 1100° F.–1300° F. Such brazing compound has been found particularly suitable when brazing PDC cutters of the type described to a matrix body bit formed of a tungsten carbide metal and filling the voids with a tungsten carbide powder; however, other brazing materials may be as suitable for such matrix body and polycrystalline diamond cutters if they come within the above described parameters.

I claim:

1. An improved method of assembling a rock bit comprising a bit body defining a cutter receiving cavity and a polycrystalline diamond cutter element defining a polycrystalline diamond wafer bonded to a surface of a stud member and wherein a portion of said stud is received and retained within said cavity and wherein dissimilar geometries between the cutter element and surface of the bit body adjacent the cavity provides voids between the internal wall of the cavity and the stud, the imrovement comprising:
   filling said voids with a powder wear-resistant material to a depth to form a generally continuous surface on said body adjacent said cutter element;
   disposing a brazing material in contact with said powder wear-resistant material; and,
   melting said braze material adjacent said powder in a manner to cause said braze material to flow throughout said powder for, upon solidifying, unifying said powder; whereby a wear-resistant continuous surfce is provided immediately adjacent the juncture of the bit body and the cutting element.

2. A method according to claim 1 wherein said melting step comprises heating said braze material and powder to a temperature not to exceed a temperature that deleteriously effects the diamond material or the bonded joint of the diamond wafer to the stud.

3. The method according to claim 2 wherein said temperature does not exceed 1450° F.

4. The method of claim 2 wherein said filling step comprises filling said voids to a depth substantially level with the surface of said bit with a powder tungsten carbide material.

5. Structure according to claim 2 wherein said disposing step comprises wrapping said stud in a brazing-foil material so that said foil generally encircles said stud and extends above the adjacent surface of said bit when said stud is seated within said cavity, whereby said stud is brazed within said cavity concomitantly with said powder being infiltrated.

6. A bit body having a cutter element securely mounted in a cavity therein and wherein dissimilar adjacent geometries of said cutter and said bit body of said cavity difine voids between the surface of the cutter element generally below the surface of the bit body; a powder wear-resistant material disposed within the voids generally to the level of the adjacent bit body surface; and a braze material infiltrated, in liquified form, into said powder, which, upon solidifying, defines a wear-resistant generally continuous surface at the juncture of the bit body and cutter element.

7. Structure according to claim 6 wherein said powder wear-resistant material comprises powder tungsten carbide.

8. Structure according to claim 6 wherein said powder wear-resistant material has a Vicker's Hardness number greater than 2000.

* * * * *